(12) United States Patent
Kawamura et al.

(10) Patent No.: US 10,879,644 B2
(45) Date of Patent: Dec. 29, 2020

(54) BUSBAR COMPONENT, TERMINAL BLOCK, AND VEHICULAR DEVICE

(71) Applicant: Yazaki Corporation, Tokyo (JP)

(72) Inventors: Yukihiro Kawamura, Makinohara (JP); Naoki Isaka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/365,190

(22) Filed: Mar. 26, 2019

(65) Prior Publication Data

US 2019/0305471 A1 Oct. 3, 2019

(30) Foreign Application Priority Data

Mar. 30, 2018 (JP) .................. 2018-066896

(51) Int. Cl.
| | | |
|---|---|---|
| *H01R 13/52* | (2006.01) | |
| *B60R 16/02* | (2006.01) | |
| *B60R 16/023* | (2006.01) | |
| *H01R 9/24* | (2006.01) | |
| *H01R 13/516* | (2006.01) | |
| *H01R 13/74* | (2006.01) | |

(Continued)

(52) U.S. Cl.
CPC ..... *H01R 13/5202* (2013.01); *B60R 16/0207* (2013.01); *B60R 16/0239* (2013.01); *H01R 9/24* (2013.01); *H01R 13/41* (2013.01); *H01R 13/516* (2013.01); *H01R 13/521* (2013.01); *H01R 13/748* (2013.01); *H01R 25/162* (2013.01); *H01R 2201/26* (2013.01)

(58) Field of Classification Search
CPC .. H01R 13/5202; H01R 13/41; H01R 25/162; H01R 13/748; H01R 13/521; H01R 13/516; H01R 9/24; H01R 13/52; H01R 9/032; H01R 11/03; H01R 13/6581; H01R 13/405; B29C 45/14; B60L 50/72
USPC .......................................................... 439/271
See application file for complete search history.

(56) References Cited

U.S. PATENT DOCUMENTS

| | | | | |
|---|---|---|---|---|
| 7,059,918 B2* | 6/2006 | Matsumoto | ............. | B60L 50/72 439/752 |
| 8,545,265 B2* | 10/2013 | Sakamoto | ............... | B29C 45/14 439/606 |
| 9,059,534 B2* | 6/2015 | Endo | ...................... | H01R 13/52 |

(Continued)

FOREIGN PATENT DOCUMENTS

| | | |
|---|---|---|
| CN | 103840304 A | 6/2014 |
| JP | 2000-323220 A | 11/2000 |

(Continued)

*Primary Examiner* — Jean F Duverne
(74) *Attorney, Agent, or Firm* — Sughrue Mion, PLLC

(57) ABSTRACT

A busbar component constructing a terminal block has a busbar, a circular O-ring attached to a busbar main body of the busbar, and a holder attached to the busbar main body through an insertion hole of the holder. The busbar main body is formed with a busbar-side engagement portion. A holder main body is arranged between a busbar-side engagement portion and the O-ring. The holder main body is formed with a ring-shaped pressing portion on one opening side of the insertion hole. The holder main body is formed with, on another opening side of the insertion hole, a holder-side engagement portion which is engaged with the busbar-side engagement portion.

9 Claims, 14 Drawing Sheets

(51) Int. Cl.
*H01R 25/16* (2006.01)
*H01R 13/41* (2006.01)

(56) References Cited

U.S. PATENT DOCUMENTS

| | | | |
|---|---|---|---|
| 9,379,476 B2* | 6/2016 | Tanaka | H01R 13/405 |
| 2002/0048994 A1* | 4/2002 | Oota | H01R 9/24 |
| | | | 439/98 |
| 2004/0144557 A1* | 7/2004 | Miyazaki | H01R 13/6581 |
| | | | 174/72 A |
| 2007/0105427 A1* | 5/2007 | Mori | H01R 11/03 |
| | | | 439/364 |
| 2010/0159743 A1 | 6/2010 | Kato et al. | |
| 2011/0014822 A1* | 1/2011 | Kato | H01R 9/032 |
| | | | 439/733.1 |
| 2013/0217262 A1 | 8/2013 | Ikeda et al. | |
| 2015/0280354 A1 | 10/2015 | Rangi et al. | |
| 2017/0117675 A1 | 4/2017 | Itou | |

FOREIGN PATENT DOCUMENTS

| | | |
|---|---|---|
| JP | 2012-69261 A | 4/2012 |
| JP | 2014-232628 A | 12/2014 |

\* cited by examiner

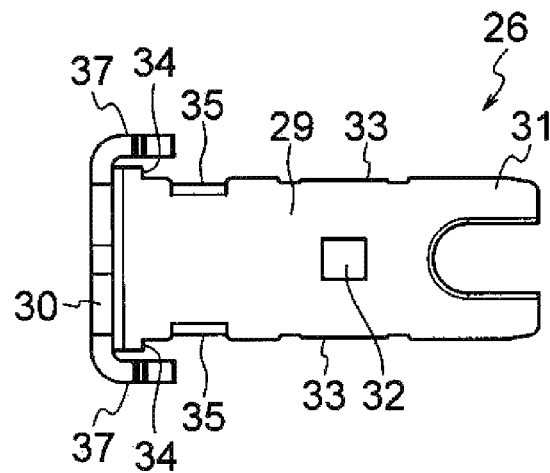
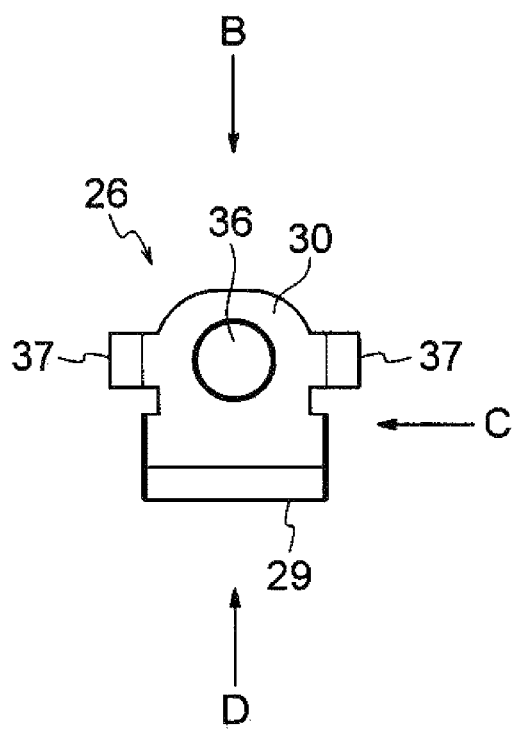
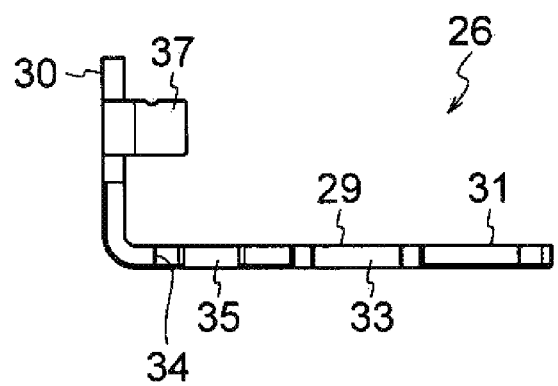
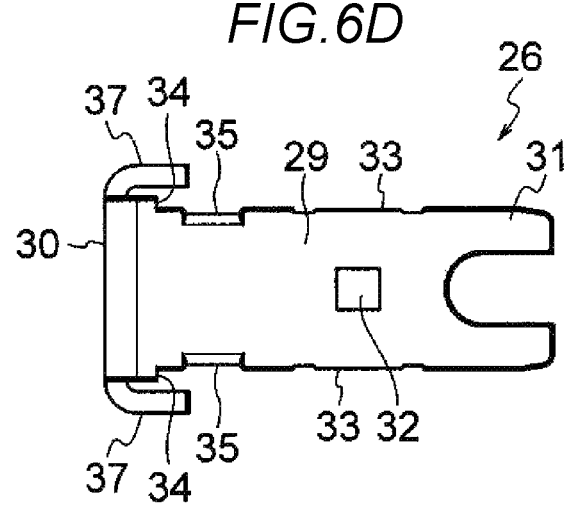

BUSBAR COMPONENT, TERMINAL BLOCK, AND VEHICULAR DEVICE

CROSS-REFERENCE TO RELATED APPLICATIONS

This application is based on and claims priority under 35 USC 119 from Japanese Patent Application No. 2018-66896 filed on Mar. 30, 2018, the contents of which are incorporated herein by reference.

TECHNICAL FIELD

The present invention relates to a busbar component having a busbar, an O-ring, and a holder. The invention also relates to a terminal block which includes the busbar component as well as to a vehicular device to which a wire harness is connected via the terminal block.

BACKGROUND ART

A terminal block disclosed in Patent document 1 is known which is attached to a wall of a device box and used for electrical connection between the inside and the outside of the wall. The configuration of this terminal block will be described below briefly with reference to FIGS. 12 and 13. A terminal block 1 is equipped with a housing 2, a busbar 3, a stud bolt 4, O-rings 5 and 6, and a holder 7.

The housing 2, which is attached to a wall of a device box (not shown) by bolts (not shown), has a wall insertion portion 8 to be inserted into an insertion hole that penetrates through the wall and a housing main body 9 which is continuous with the wall insertion portion 8. The busbar 3 has a busbar main body 10, an outside terminal portion 11 which is continuous with the busbar main body 10 at its one end, and an inside terminal portion 12 which is continuous with the busbar main body 10 at its other end. The outside terminal portion 11 is bent from the busbar main body 10 by 90°, whereby the busbar 3 is approximately L-shaped. The terminal block 1 is assembled in such a manner that the busbar main body 10 of the busbar 3 is inserted into the housing 2 and the holder 7.

The busbar 3 is disposed so that the inside terminal portion 12 is exposed inside the wall and the outside terminal portion 11 is exposed outside the wall. In a state that the terminal block 1 is assembled, the stud bolt 4 is inserted in the outside terminal portion 11.

The O-ring 5 serves to ensure necessary waterproofness between the housing 2 and the busbar 3. The O-ring 6 serves to ensure necessary waterproofness between the wall (through-hole) and the housing 2. The holder 7 serves to prevent dropping of the O-ring 5 attached to the housing main body 9. The holder 7 has two lock portions 13, and the housing main body 9 also has two lock portions 14. In the terminal block 1, the holder 7 is fixed to the housing main body 9 when the lock portions 13 are locked on the respective lock portions 14, whereby the O-ring 5 is prevented from coming off.

As seen from FIGS. 12 and 13, the locking between the lock portions 13 and the lock portions 14 is made in the vicinities of portions (bolt fixing holes 15) where the housing 2 is fixed to the wall.

As shown in FIGS. 12 and 13, the busbar 3 is locked on a housing-side lock portion (not shown) which is formed inside the wall insertion portion 8. A busbar-side lock hole 16 is formed in the busbar main body 10. The outside terminal portion 11 of the busbar 3 is formed with a pair of engagement pieces 17.

PRIOR ART DOCUMENTS

Patent Documents

Patent document 1: JP-A-2012-69261

SUMMARY OF INVENTION

In the above-described conventional technique, when the terminal block 1 is assembled, the busbar main body 10 is merely inserted into the holder 7. As a result, the holder 7 is prone to play (deviate) in the direction indicated by an arrow in FIG. 14. If the holder 7 is in contact with the O-ring 5 in a state that the holder 7 is bent to some extent due to its play, a problem arises that this affects the waterproofness of the O-ring 5.

The present invention has been made in view of the above circumstances, and an object of the invention is therefore to provide a busbar component in which play of a holder is suppressed and hence it can come into contact with and be pressed against an O-ring squarely. Other objects are to provide a terminal block including the busbar component and a vehicular device to which a wire harness is connected via the terminal block.

To attain one of the above objects, a busbar component of the present invention has a busbar, a ring-shaped O-ring attached to a busbar main body of the busbar, and a holder attached to the busbar main body through an insertion hole of the holder. The busbar main body is formed with busbar-side engagement portions. The holder has a holder main body which is arranged between the busbar-side engagement portion and the O-ring and which has the insertion hole of the holder. The holder main body is formed with, on one opening side of the insertion hole, a ring-shaped pressing portion which is pressed against the O-ring. The holder main body is formed with, on another opening side of the insertion hole, a holder-side engagement portion which is engaged with the busbar-side engagement portion.

According to the busbar component having the above configuration, since the busbar and the holder are engaged with each other, play of the holder with respect to the busbar can be suppressed, as a result of which the holder can come into contact with and be pressed against the O-ring squarely when the busbar is pushed. Since the holder comes into contact with and be pressed against the O-ring squarely, the O-ring can provide necessary waterproofness performance for a member (e.g., a housing that is a component of a terminal block) to which the busbar component is attached.

The busbar-side engagement portion and the holder-side engagement portion are formed so as to have an engagement direction that coincides with an axial direction of the busbar main body and a pressing direction for the O-ring.

According to the present invention, since the busbar-side engagement portions and the holder-side engagement portions are formed in the above-described manner, when the busbar is pushed, the busbar-side engagement portions are engaged with the respective holder-side engagement portions in the pushing direction and the holder comes into square contact with the O-ring in the engagement direction. Thus, the O-ring is pushed reliably.

The busbar-side engagement portion is formed in each of two side surfaces of the busbar main body, and the holder-side engagement portion is formed at each of two side positions of the insertion hole that penetrates according to a cross sectional shape of the busbar main body.

According to the present invention, the busbar-side engagement portions and the holder-side engagement portions are formed at the above-mentioned positions (that is, the busbar-side engagement portions are formed in a pair and the holder-side engagement portions are also formed in a pair). Thus, when the busbar is pushed, force is not concentrated at one portion and hence stable engagement states can be obtained.

The holder-side engagement portion is formed so as to have a recessed portion in which the busbar-side engagement portions is inserted.

According to the present invention, the recessed portion in the holder-side engagement portion is inserted into the busbar-side engagement portion. Thus, surfaces opposed to each other of the holder-side engagement portions and the busbar-side engagement portions come into contact with each other, whereby play of the holder with respect to the busbar can be suppressed. As a result, when the busbar is pushed, the holder can come into contact with and be pressed against the O-ring squarely.

An outside terminal portion extends from one end of the busbar main body perpendicularly to the axial direction of the busbar main body, and a terminal engagement portion is continuous with the holder main body, and is engaged with the outside terminal portion.

According to the present invention, since the outside terminal portion of the busbar is also engaged with the holder, the number of engagement locations is increased and play of the holder can be suppressed more reliably. As a result, when the busbar is pushed, the holder can come into contact with and be pressed against the O-ring squarely.

To attain another of the above objects, another aspect of the invention provides a terminal block including the above mentioned busbar component, and a housing to which the busbar component is attached. The housing has a busbar insertion hole through which the busbar main body of the busbar component is inserted, an O-ring housing portion which houses the O-ring of the busbar component, and a holder housing portion which houses the holder main body of the busbar component. The busbar insertion hole, the O-ring housing portion, and the holder housing portion are formed so as to share the same axis that extends in a direction in which the busbar-side engagement portion is engaged with the holder-side engagement portion.

According to the present invention, the above terminal block includes the busbar component described above. Further, the individual portions of the housing are formed so as to be suitable for the engagement direction of the busbar-side engagement portions and the holder-side engagement portions of the busbar component. As a result, the terminal block is given necessary waterproof performance.

Further, the holder housing portion is formed with holder guide portions which guide at least the holder main body.

According to the terminal block of the present invention, since the holder of the busbar component is guided by the housing when the terminal block is assembled, play of the busbar component itself with respect to the housing can also be suppressed. As a result, when the busbar is pushed, the holder can come into contact with and be pressed against the O-ring squarely. Since the holder is guided by the housing, the O-ring exhibits necessary waterproof performance for the housing.

Further, the busbar insertion hole is formed with a housing-side lock portion; that the busbar main body is formed with a busbar-side lock portion on which the housing-side lock portion is locked. The terminal block is formed so that the holder is also rendered in a locked state when the housing-side lock portion is locked on the busbar-side lock portion.

According to the present invention, since the busbar is engaged with the holder in the busbar component, the holder is also locked (indirectly) at the same time as the housing-side lock portion is locked on the busbar-side lock hole. Thus, the holder need not be formed with a fixing portion that is dedicated to locking on the housing, whereby the configuration of the terminal block can be simplified or reduced in size.

To attain the other of the above objects, a further aspect of the invention provides a vehicular device having a device main body; a device box which houses the device main body; the terminal block which is attached to a wall of the device box; and a wire harness which is electrically connected to the device main body via the terminal block.

According to the present invention, the above vehicular device can provide a better vehicular device in which necessary waterproofness is secured.

The present invention provides an advantage that it can provide a busbar component in which play of a holder is suppressed and hence it can come into contact with and be pressed against an O-ring squarely. The invention provides another advantage that it can provide a terminal block including the busbar component and a vehicular device to which a wire harness is connected via the terminal block. The invention provides a further advantage that necessary waterproofness can be secured.

BRIEF DESCRIPTION OF DRAWINGS

FIG. 6A is a front view of a busbar, FIG. 6B is a top view of the busbar as viewed from the direction indicated by arrow B in FIG. 6A, FIG. 6C is a side view of the busbar as viewed from the direction indicated by arrow C, and FIG. 6D is a bottom view of the busbar as viewed from the direction indicated by arrow D.

DESCRIPTION OF EMBODIMENTS

A vehicular device according to the invention, which is installed in a vehicle, is equipped with a device main body; a device box which houses the device main body; a terminal block which is attached to a wall of the device box; and a wire harness which is electrically connected to the device main body via the terminal block. A busbar component, which is a component of the terminal block, is equipped with a busbar, a ring-shaped O-ring attached to a busbar main body of the busbar, and a holder attached to the busbar main body in such a manner that the busbar main body is inserted through an insertion hole of the holder. The busbar main body is formed with busbar-side engagement portions. The holder has a holder main body through which the insertion hole penetrates. The holder main body is formed with, on the side of one opening of the insertion hole, a ring-shaped pressing portion which is pressed against the O-ring. The holder main body is formed with, on the side of the other opening of the insertion hole, holder-side engagement portions which are engaged with the respective busbar-side engagement portions. Because of the engagement between the holder-side engagement portions and the busbar-side engagement portions, the holder can be pressed against the O-ring squarely.

Embodiment

Figure 1:
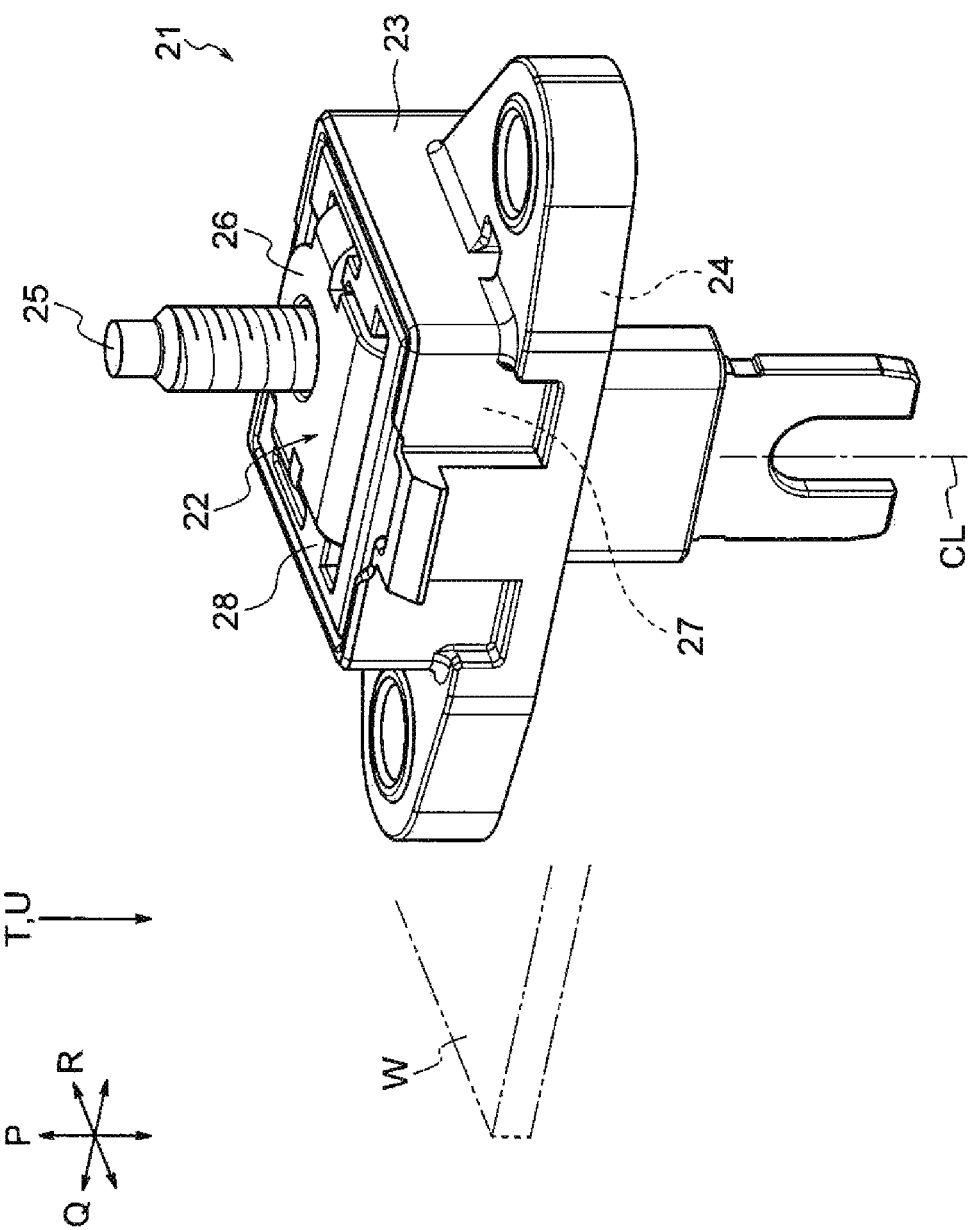
FIG. 1 is a perspective view showing a busbar component and a terminal block according to an embodiment of the present invention.
Figure 2:
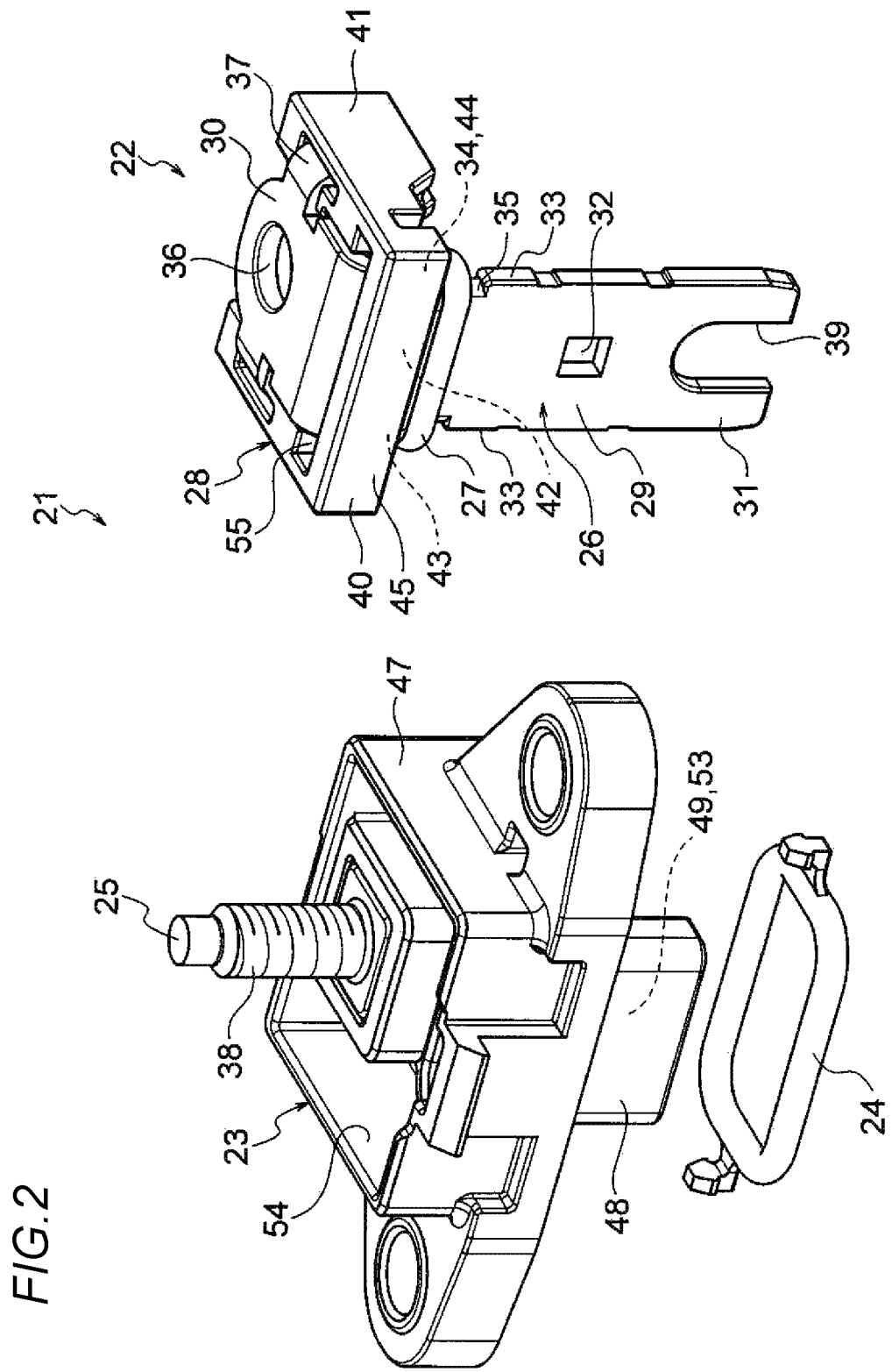
FIG. 2 is an exploded perspective view of the terminal block.
Figure 3:
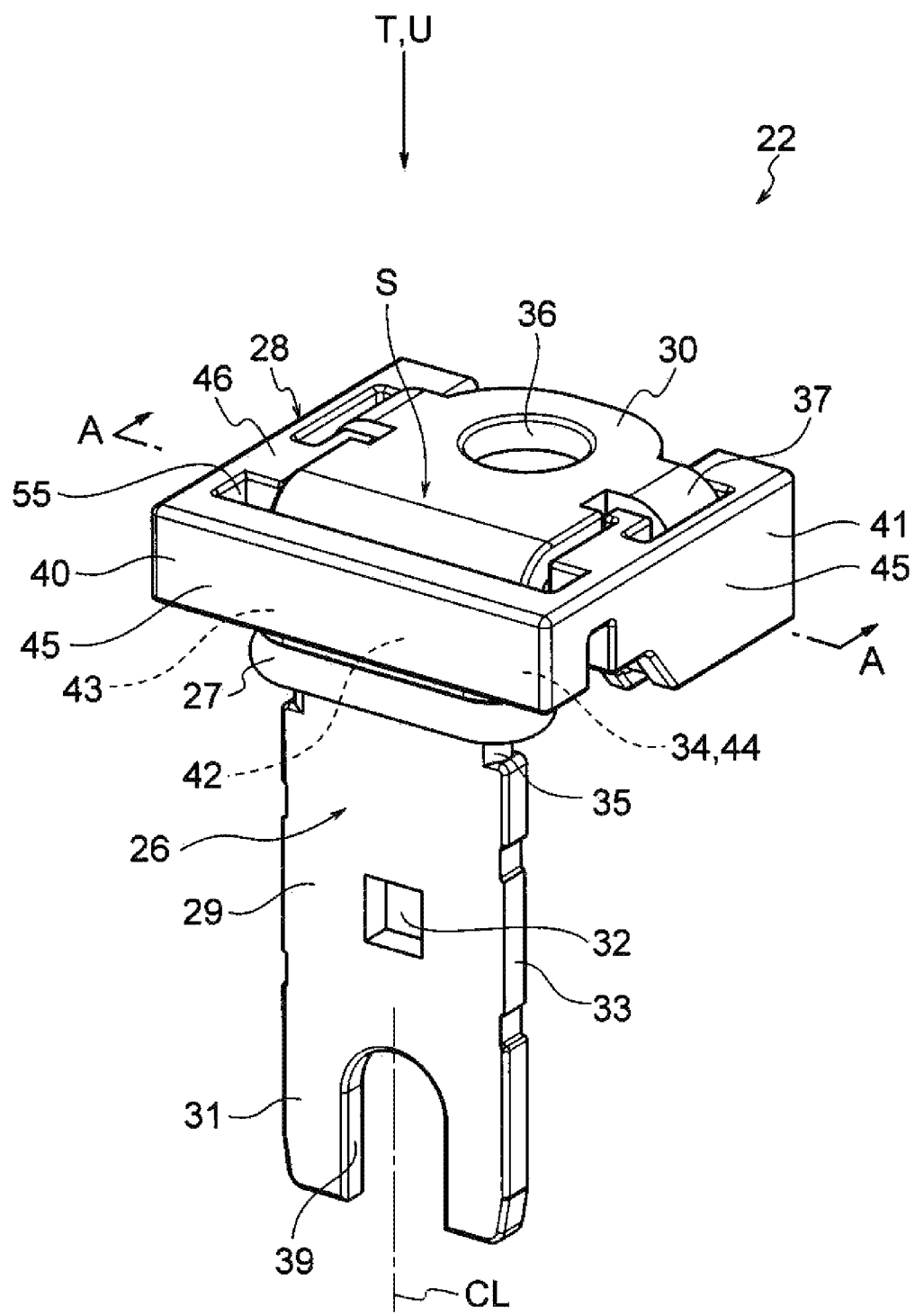
FIG. 3 is a perspective view of the busbar component.
Figure 4:
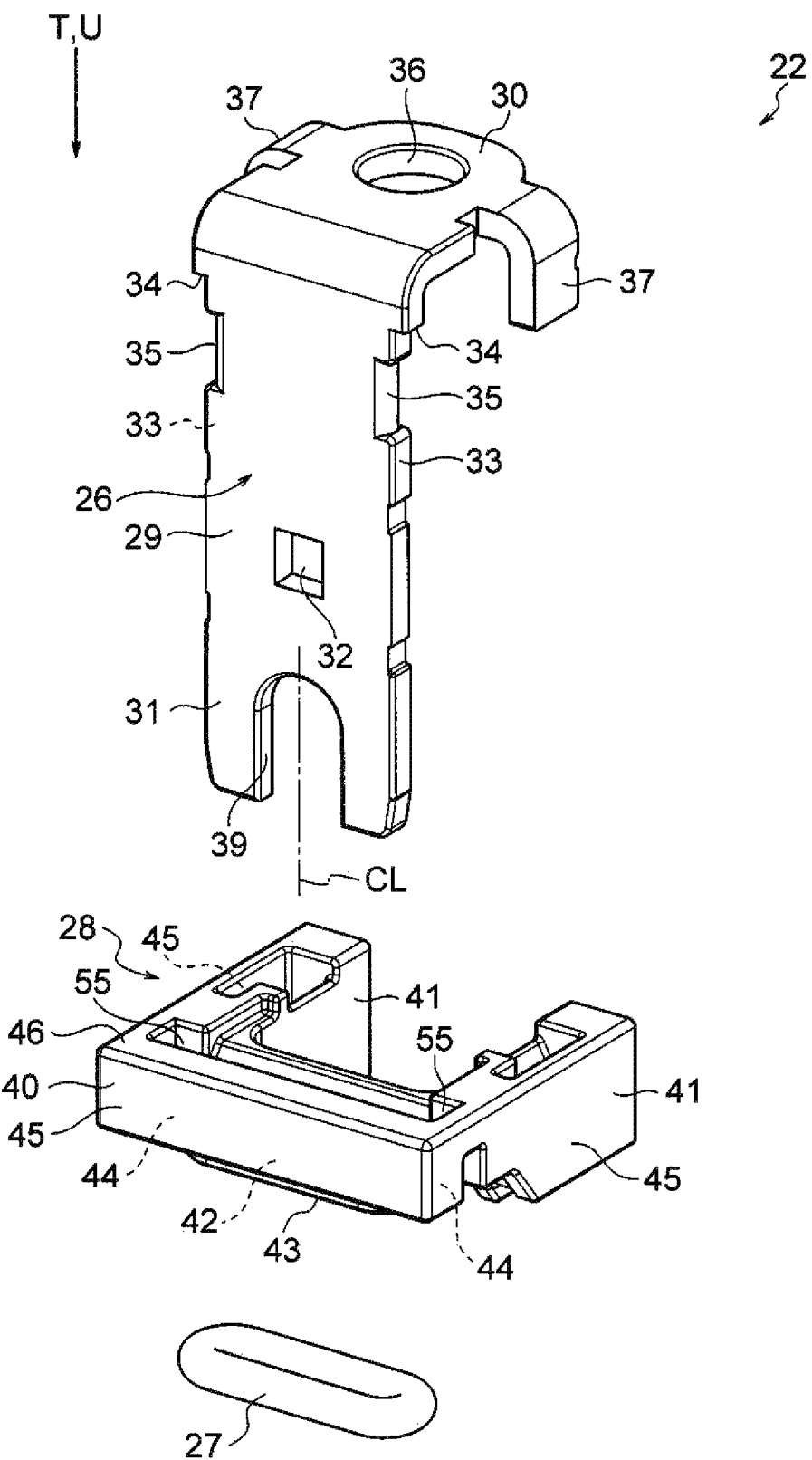
FIG. 4 is an exploded perspective view of the busbar component.
Figure 5:
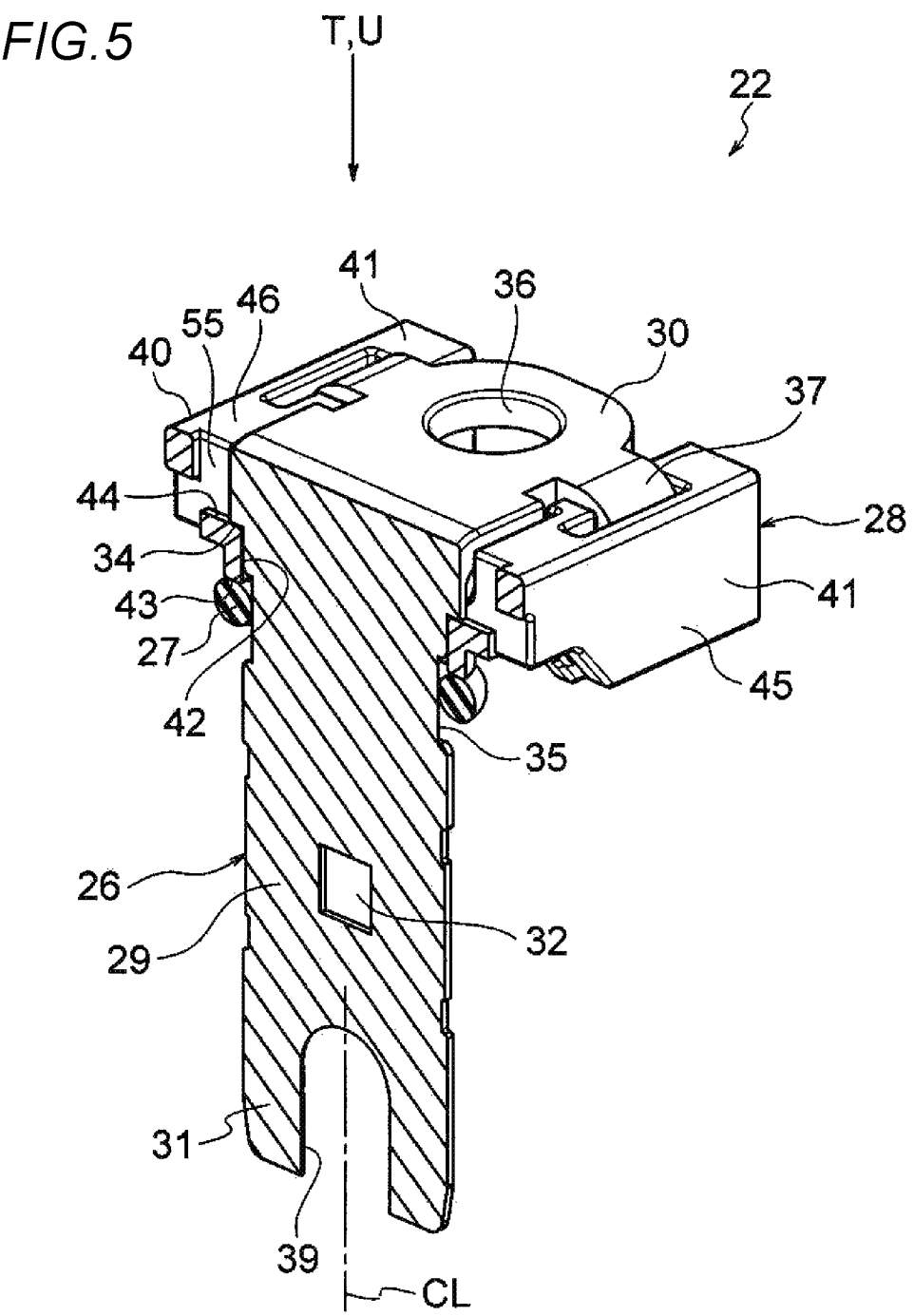
FIG. 5 is perspective view of the busbar component and is partially a sectional view taken along line A-A in FIG. 3.
Figure 7A:
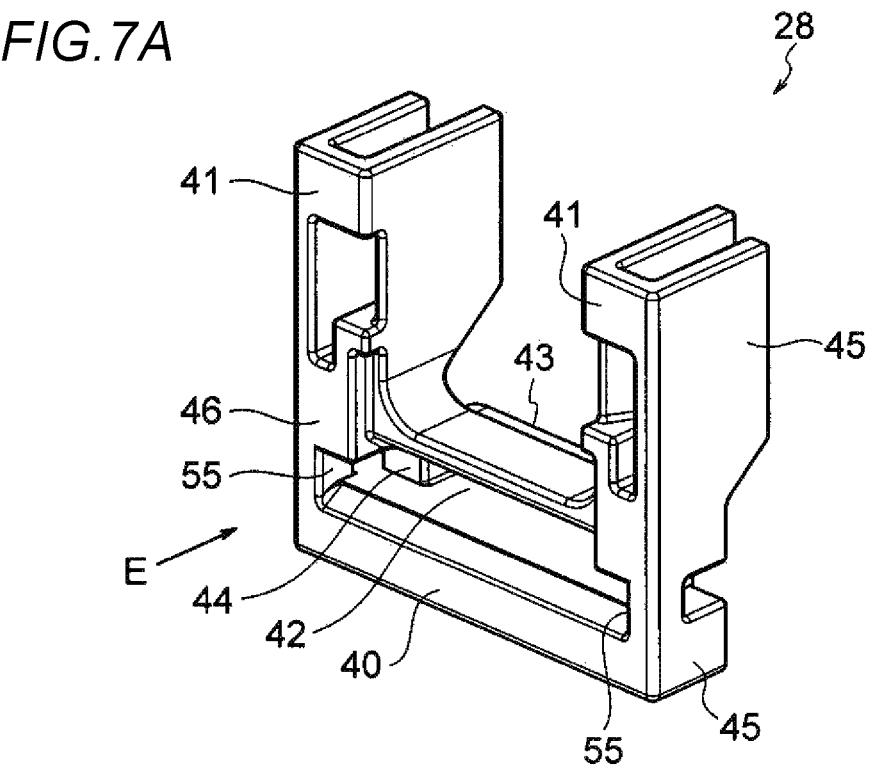
FIG. 7A is a perspective view of a holder.
Figure 7B:
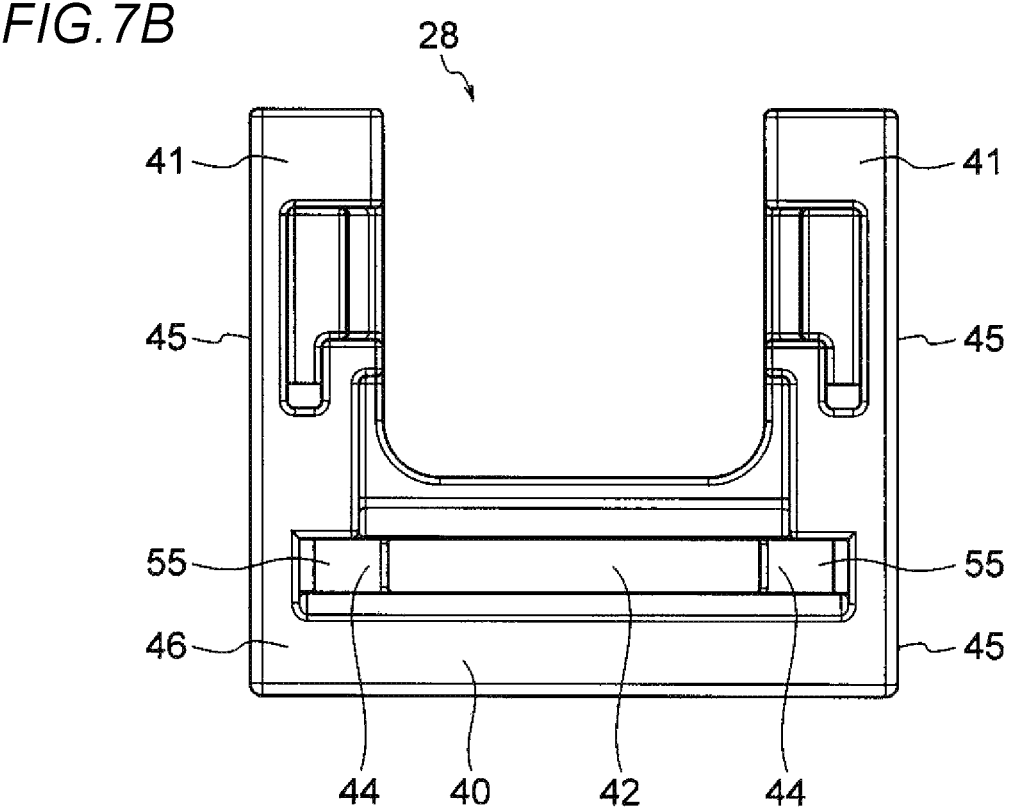
FIG. 7B is a front view of the holder as viewed from the direction indicated by arrow E in FIG. 7A.
Figure 8A:
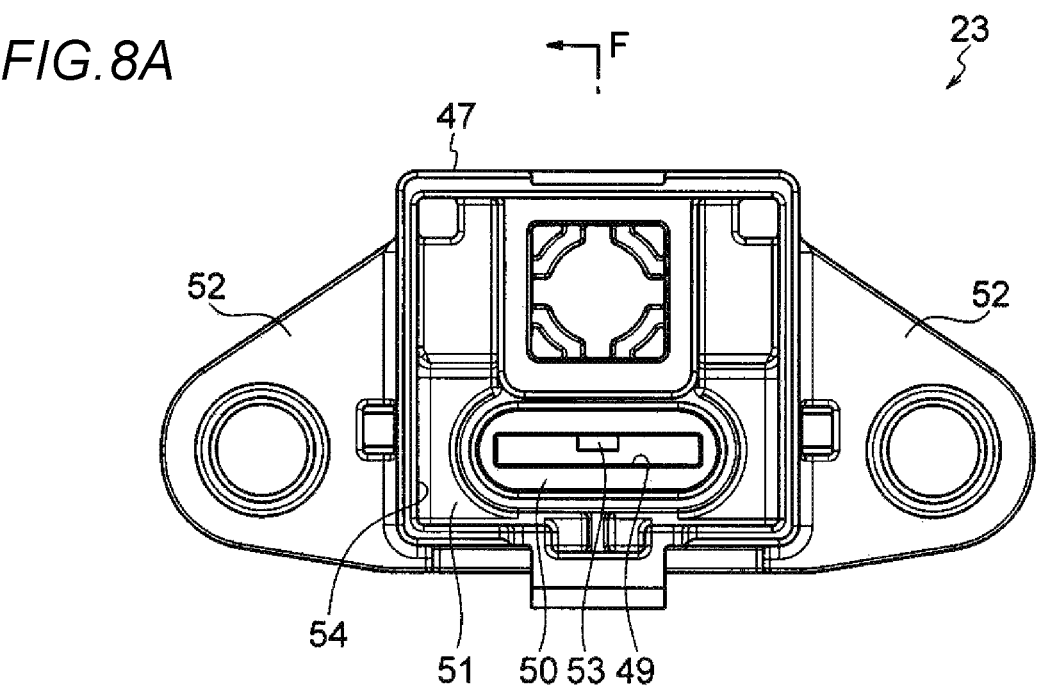
FIG. 8A is a front view of a housing.
Figure 8B:
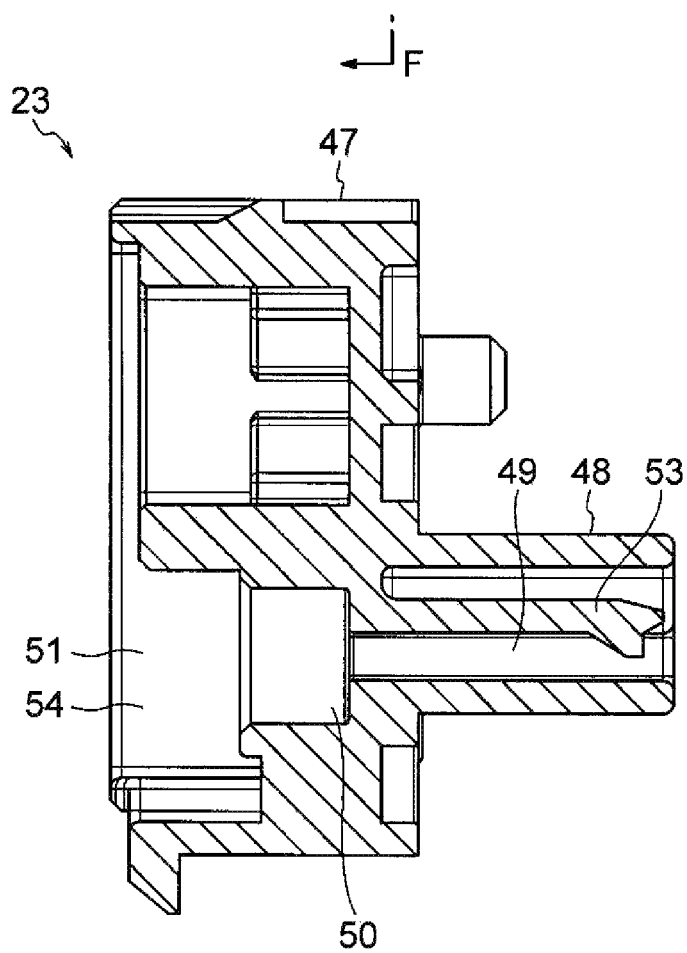
FIG. 8B is a sectional view of the housing taken along line F-F in FIG. 8A.
Figure 9:
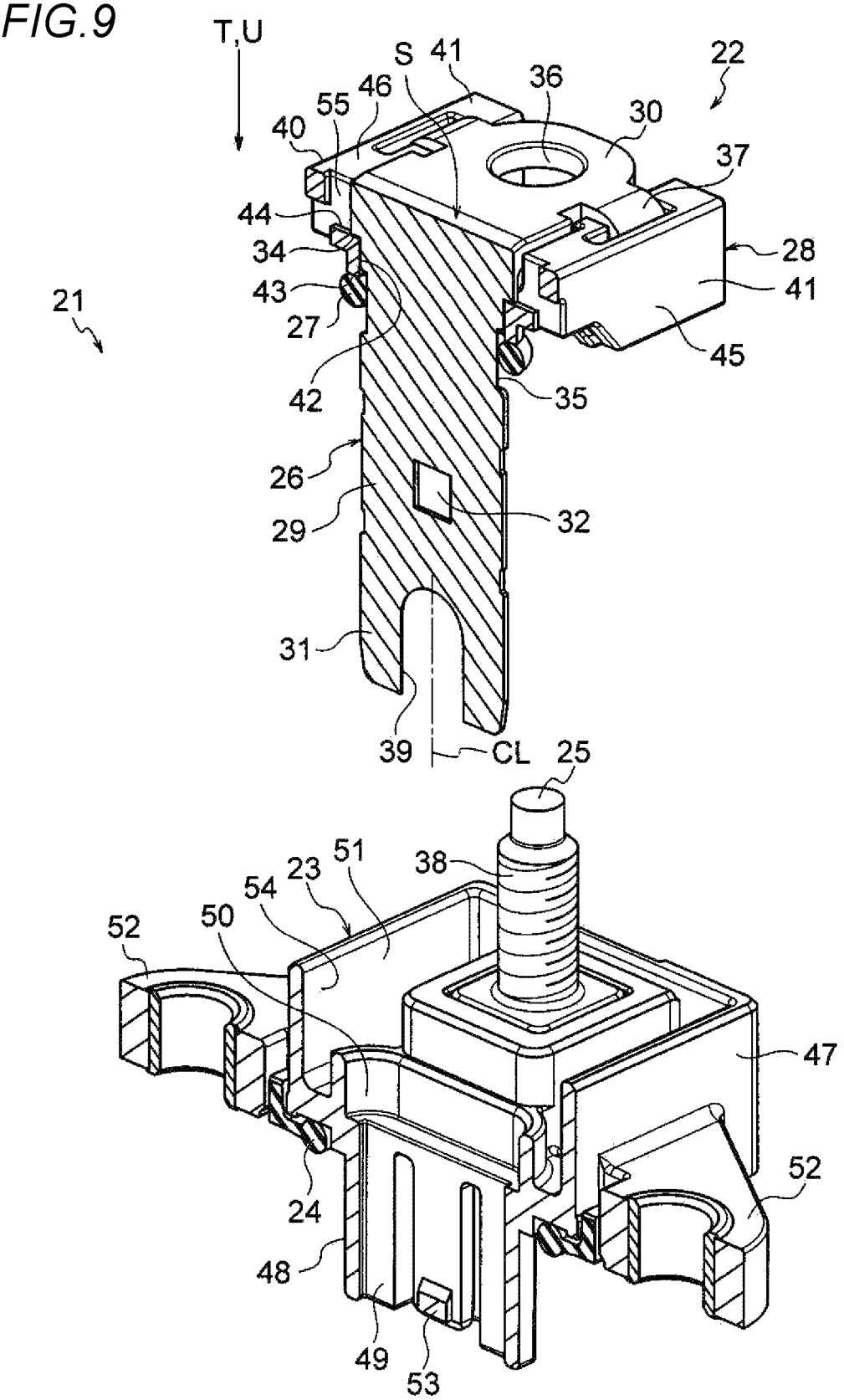
FIG. 9 is a partially sectional perspective view showing a halfway state of attachment of the busbar component to the housing.
Figure 10:
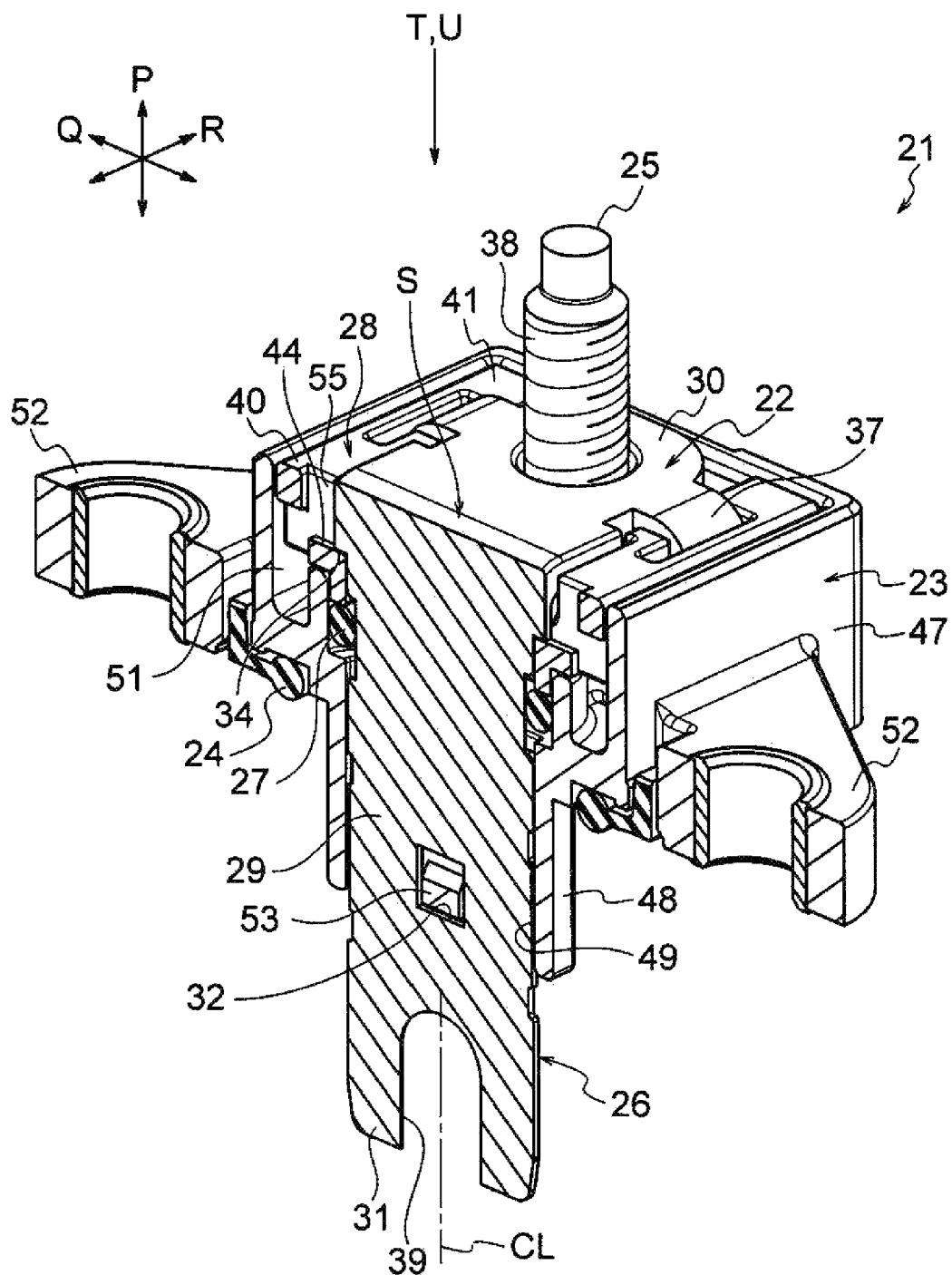
FIG. 10 is a partially sectional perspective view showing a state that the attachment of the busbar component to the housing is completed.
Figure 11:
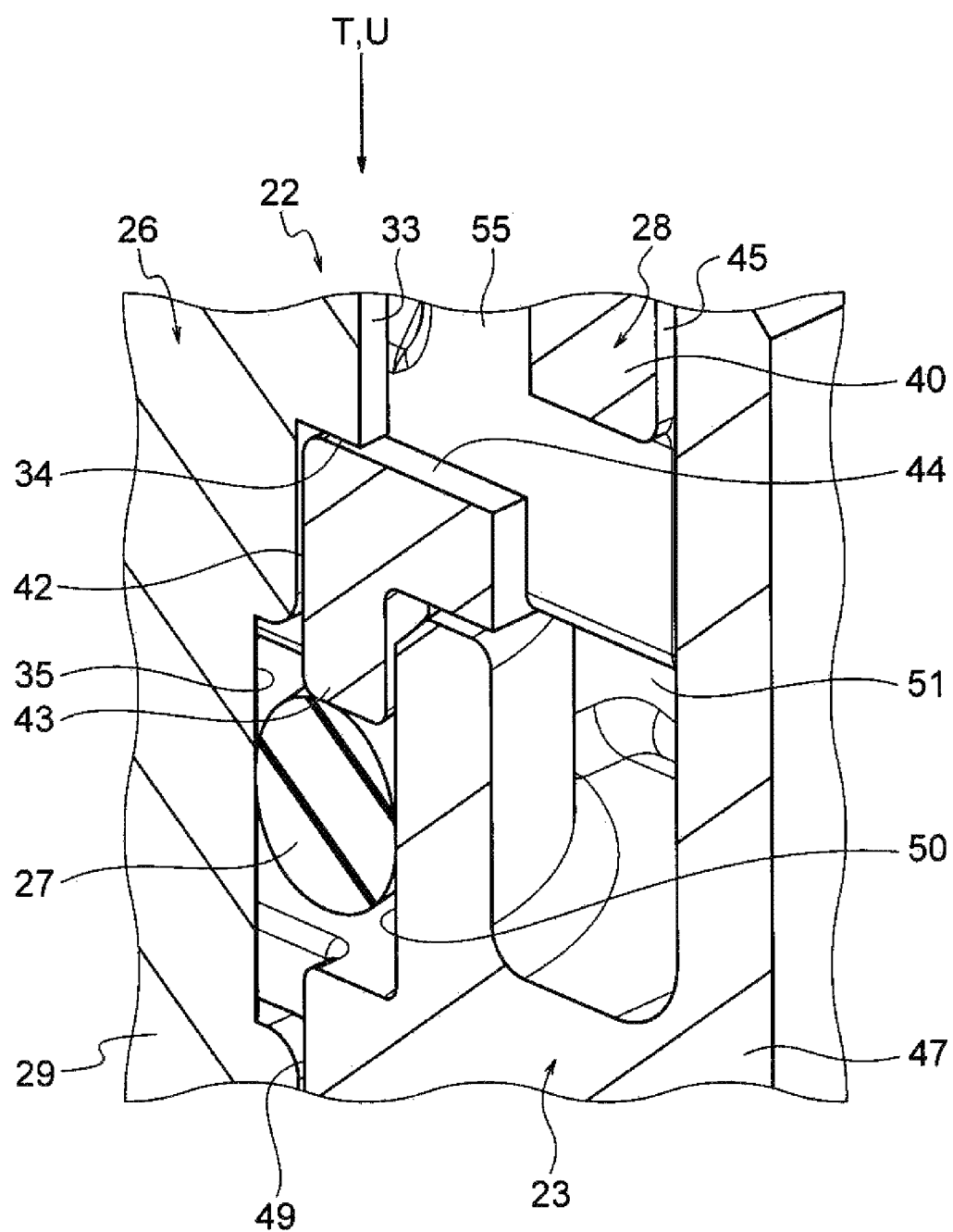
FIG. 11 is an enlarged view of an essential part of FIG. 10.
Figure 12:
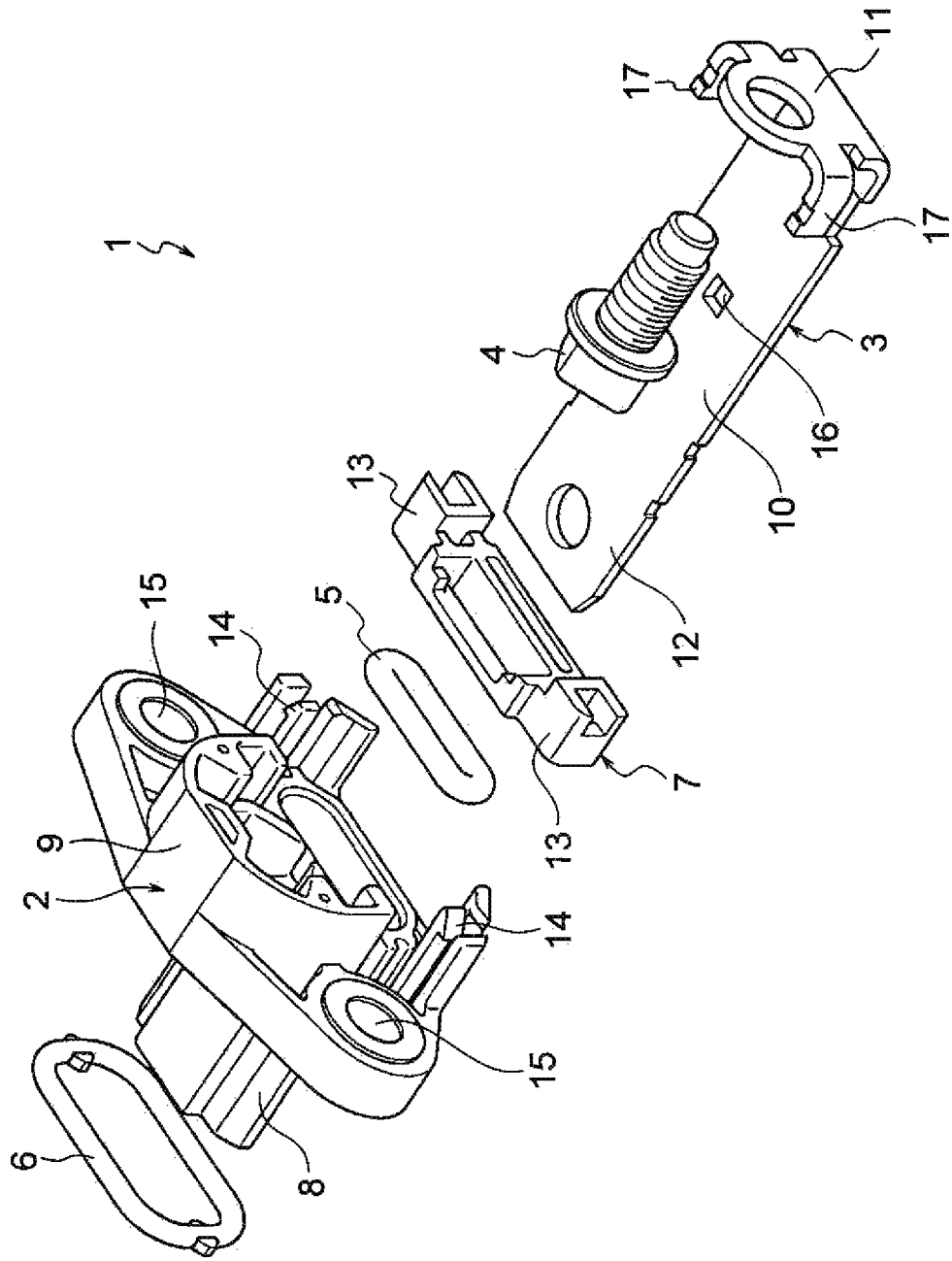
FIG. 12 is an exploded perspective view of a conventional terminal block.
Figure 13:
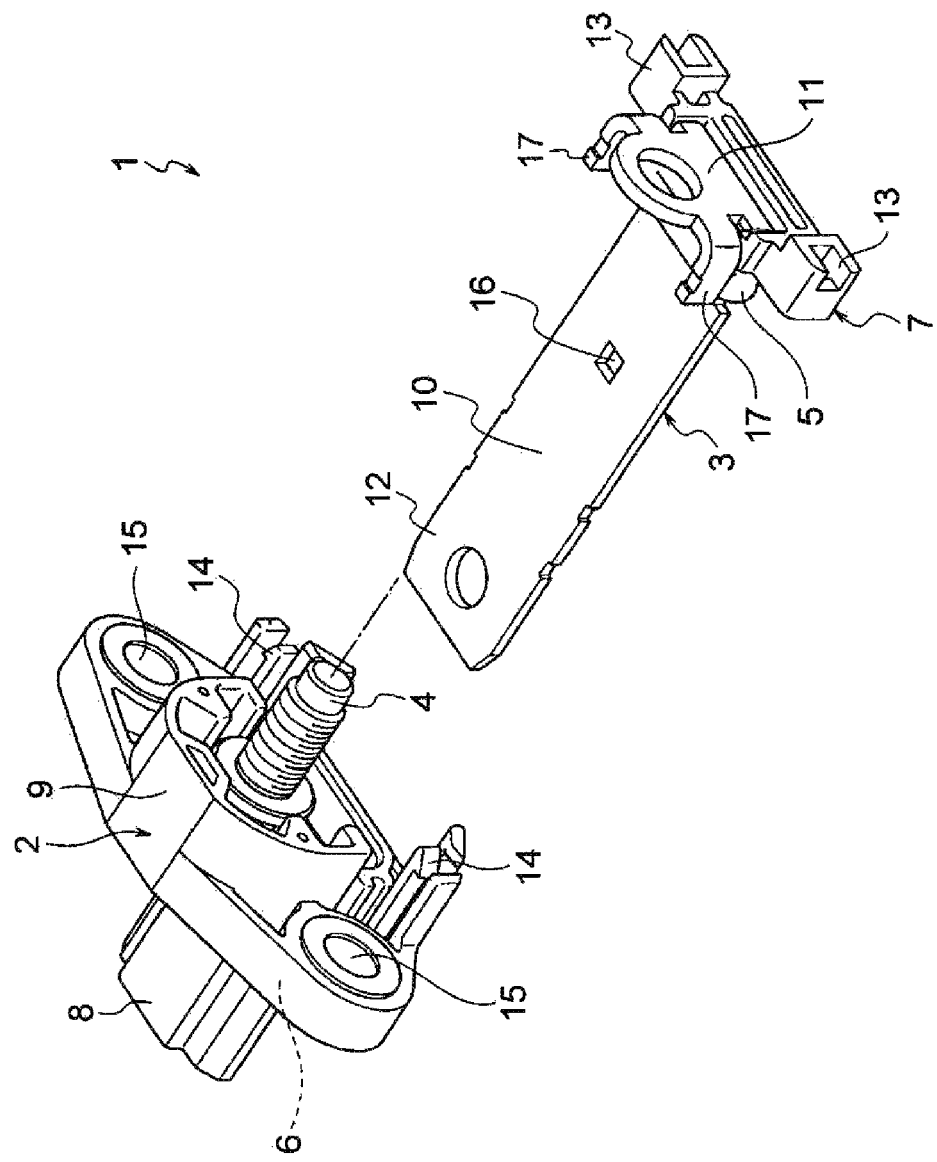
FIG. 13 is a perspective view of the conventional terminal block and shows a state that a busbar, a holder, and an O-ring are assembled together.
Figure 14:
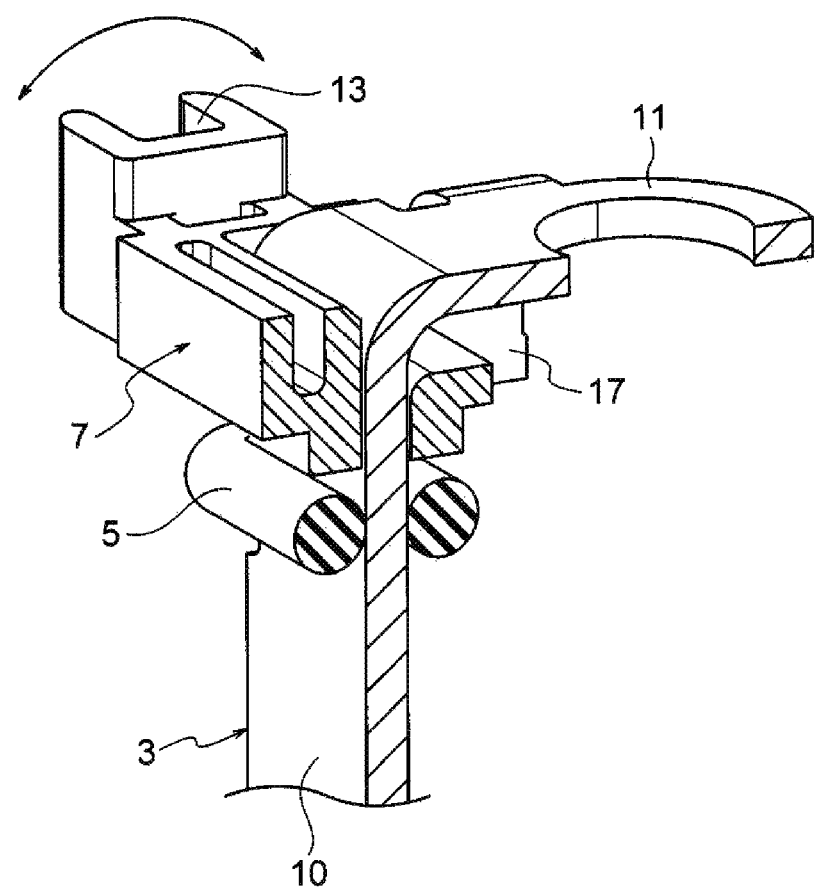
FIG. 14 is a partially sectional perspective view illustrating a problem that arises when the busbar, the holder, and the O-ring are assembled together in the conventional terminal block.

An embodiment of the present invention will be hereinafter described with reference to the drawings. FIG. 1 is a perspective view showing a busbar component 22 and a terminal block 21 according to the embodiment. FIG. 2 is an exploded perspective view of the terminal block 21. FIG. 3 is a perspective view of the busbar component 22. FIG. 4 is an exploded perspective view of the busbar component 22. FIG. 5 is perspective view of the busbar component 22 and is partially a sectional view taken along line A-A in FIG. 3. FIGS. 6A-6D show the structure of a busbar 26. FIGS. 7A and 7B show the structure of a holder 28. FIGS. 8A and 8B show the structure of a housing 23. FIG. 9 shows a halfway state of attachment of the busbar component 22 to the housing 23. FIG. 10 shows a state that the attachment of the busbar component 22 to the housing 23 is completed. FIG. 11 is an enlarged view of an essential part of FIG. 10.

In the embodiment, arrows P, Q, and R shown in FIG. 1, for example, represent the top-bottom direction, the left-right direction, and the front-rear direction, respectively.

<Configuration of Terminal Block 21>

The terminal block 21 shown in FIG. 1 is attached to a wall W of a metal device box of, for example, a DC-DC converter (vehicular device) that is installed in an automobile. In the embodiment, three terminal blocks 21 for input and output are attached to the device box of at prescribed positions, respectively. The three terminal blocks 21 have the same configuration and one of them will be described below.

As shown in FIGS. 1 and 2, the terminal block 21, which used for electrical connection between the inside and the outside of the wall W, is composed of a busbar component 22, a resin housing 23 to which the busbar component 22 is attached, and an O-ring 24 and a stud bolt 25 which are attached to the housing 23. The terminal block 21 is connected to a device main body (not shown) inside the wall W, and a wire harness (not shown) is connected to the terminal block 21 outside the wall W. The wire harness is connected to the device main body via the terminal block 21. Although in the embodiment a terminal metal fitting of the wire harness is connected to the terminal block 21 from above, this connection direction is just an example.

<Structure of Busbar Component 22>

As shown in FIGS. 1-4, the busbar component 22 is equipped with a busbar 26, an O-ring 27, and a holder 28. As will be seen from the following description, the busbar component 22 has such a structure that play of the holder 28 with respect to the busbar 26 is suppressed, whereby the holder can come into contact with and be pressed against the O-ring 27 squarely.

<Busbar 26>

Referring to FIGS. 6A-6D (and FIGS. 1-5 when necessary), the busbar 26, which is a member necessary for electrical connection between the outside and the inside of the wall W, is formed by press-forming a conductive, relatively thick metal plate. The busbar 26 is formed into the shape shown in FIGS. 6A-6D so as to have a busbar main body 29, an outside terminal portion 30, and an inside terminal portion 31.

The busbar main body 29, which is a member located between the outside terminal portion 30 and the inside terminal portion 31, is shaped like a band plate having flat front and back surfaces. A rectangular busbar-side lock hole 32 penetrates through the busbar main body 29 at its middle position. The busbar-side lock hole 32 serves as a lock portion on which a housing-side lock portion 53 (described later with reference to FIGS. 8A and 8B) of the housing 23 is to be locked.

Two busbar side surfaces 33 (an example of the term "two side surfaces" used in the claims) of the busbar main body 29 are formed with busbar-side engagement portions 34 and O-ring attachment surfaces 35, respectively, at positions that are closer to the one end, where the busbar main body 29 is continuous with the outside terminal portion 30, of the busbar main body 29 than the busbar-side lock hole 32.

The busbar-side engagement portions 34 have surfaces that are formed in respective step portions where the two busbar side surfaces 33 go inward to form respective cutting edges at a position that is close to the one end of the busbar main body 29. These surfaces of the busbar-side engagement portions 34 are a pair of engagement surfaces on which respective holder-side engagement portions 44 (described later) of the holder 28 are hooked and the holder 28 can thereby be pushed. As shown in FIGS. 10 and 11, the busbar-side engagement portions 34 also include respective surfaces to sandwich the holder 28 between themselves and the housing 23 and thereby hold the holder 28 to have it locked.

The O-ring attachment portions 35 are recesses in which the O-ring 27 is to be set. The O-ring attachment portions 35 are formed at a position that is more distant from the one end of the busbar main body 29 than the busbar-side engagement portions 34 are. The O-ring attachment portions 35 are formed in such a manner as not to damage the O-ring 27, that is, as not to have edges or the like (see FIG. 4).

The outside terminal portion 30 is bent from the busbar main body 29 by 90°. In other words, the outside terminal portion 30 extends perpendicularly to the axis CL of the busbar main body 29. The outside terminal portion 30 serves for electrical connection to a terminal metal fitting of a wire harness terminal. The thus-formed outside terminal portion 30 has a circular insertion hole 36 (through-hole) and a pair of engagement pieces 37.

The insertion hole 36 is a hole into which a shaft portion 38 of the stud bolt 25 is to be inserted. The pair of engagement pieces 37 are side portions, bent toward a bottom wall of the housing 23, of the outside terminal portion 30. The pair of engagement pieces 37 are portions to be inserted into a pair of terminal engagement portions 41 (described later) of the holder 28. (From another point of view, the pair of engagement pieces 37 are portions to be held by the pair of terminal engagement portions 41).

The inside terminal portion 31 is a portion that is continuous with the other end of the busbar main body 29. The inside terminal portion 31 also serves as a portion for electrical connection to a device-side terminal metal fitting (not shown) of the device main body inside the wall W. In the embodiment, the inside terminal portion 31 has a U-shaped cut 39 (see FIGS. 6B and 6D, for example).

In the busbar 26 having the above configuration, each of the busbar main body 29, the outside terminal portion 30, and the inside terminal portion 31 is symmetrical with respect to the axis CL of the busbar main body 29.

<O-Ring 27>

Made of rubber or elastomer and hence being elastic, the O-ring 27 (see FIGS. 4 and 5) is provided to ensure necessary waterproofness between the busbar 26 and the housing 23. The O-ring 27 is approximately shaped like an elliptical ring in a plan view and is circular in cross section. The thus-formed O-ring 27 is attached to the O-ring attachment portions 35 of the busbar 26 (busbar main body 29).

<Holder 28>

Referring to FIGS. 7A and 7B (and FIGS. 1-5 when necessary), the holder 28 is a resin member for holding the O-ring 27 by pressing it squarely to a prescribed position of the housing 23. The holder 28 has a holder main body 40 and the pair of terminal engagement portions 41 and has a shape shown in FIGS. 7A and 7B. The holder 28 is shaped so as to be attached to the busbar 26 to become a constituent member of the busbar component 22 and then housed in a holder housing portion 51 (described later) of the housing 23. The holder 28 is not fixed to the housing 23 by a lock structure. (The holder 28 is different from the conventional holder 7 in this respect and hence is smaller and simpler in structure than the latter).

The holder main body 40 is formed so as to be attached to the busbar main body 29 in such a manner that the latter is inserted into the former. The holder main body 40 has an insertion hole 42, a pressing portion 43, a pair of holder-side engagement portions 44, and guide target surfaces 45 and has a shape shown in FIGS. 7A and 7B. As will be seen from the following description, the holder main body 40 is formed as a member whose play with respect to the busbar main body 29 is suppressed.

The insertion hole 42 is formed so as to conform to the sectional shape (long and narrow rectangle) of the busbar main body 29 and penetrates through the holder main body 40. The inner circumferential surface of the insertion hole 42 is parallel with and is opposed to the outer circumferential surface of the busbar main body 29, whereby these surfaces easily come into contact with each other. As a natural result, play of the holder main body 40 with respect to the busbar main body 29 is suppressed.

In a state that the holder main body 40 is attached to the busbar main body 29, the center axis (not shown) of the insertion hole 42 coincides with the axis CL of the busbar main body 29 (see FIG. 3).

As shown in FIG. 5, the pressing portion 43 is formed on the side of one opening of (in the vicinity of the bottom opening of) the insertion hole 42. The pressing portion 43, which serves as a contact portion and a pressing portion for the O-ring 27, is shaped like a ring so as to conform to the shape of the O-ring 27. The pressing portion 43 is formed so as to have a flat contact/pressing surface which is perpendicular to the axis CL (see FIG. 3) of the busbar main body 29.

The holder-side engagement portions 44 are formed on the side of the other opening of (in the vicinity of the top opening of) the insertion hole 42. In other words, the holder-side engagement portions 44 are formed on the side opposite to the pressing portion 43. The holder-side engagement portions 44 are formed at two respective side positions in the insertion hole 42. The holder-side engagement portions 44 are formed as portions with which the respective busbar-side engagement portions 34 are to engage (i.e., as portions to be hooked on and pushed by the respective busbar-side engagement portions 34). The thus-formed holder-side engagement portions 44 are located at a position that is one-step lower than a top surface 46.

Since the holder-side engagement portions 44 are located at the position that is one-step lower than a top surface 46, recessed portions 55 are formed so as to include the top surfaces of the holder-side engagement portions 44, respectively. As a result, the holder-side engagement portions 44, which adjoin the recessed portions 55, go into the busbar-side engagement portions 34, respectively, whereby surfaces opposed to each other of the holder-side engagement portions 44 and the busbar-side engagement portions 34 come into contact with each other easily. This naturally contributes to suppression of play of the holder main body 40 with respect to the busbar main body 29.

The guide target surfaces 45 are outer surfaces of the holder main body 40 and serve as surfaces to be guided by corresponding holder guide portions 54 of the holder housing portion 51 (described later) of the housing 23 (see FIGS. 8A and 8B). Since the guide target surfaces 45 are guided by the holder guide portions 54, play of the holder main body 40 is suppressed from the housing 23 side.

The terminal engagement portions 41 are continuous with left and right end portions of the holder main body 40. The terminal engagement portions 41 are portions with which the engagement pieces 37 of the outside terminal portion 30 of the busbar 26 are to engage. The terminal engagement portions 41 are portions into which the engagement pieces 37 are to be inserted. (From another point of view, the terminal engagement portions 41 are portions for holding the engagement pieces 37.) Like the outer surface of the holder main body 40, the terminal engagement portions 41 have respective guide target surfaces 45.

<Assembling of Busbar Component 22>

As shown in FIGS. 3-5, first the holder 28 is attached to the busbar main body 29 in such a manner that the busbar main body 29 is inserted into the insertion hole 42 (the inside terminal portion 31 is inserted first) until the holder 28 is located at the one end of the busbar main body 29. When the holder 28 is attached to the busbar main body 29, the busbar-side engagement portions 34 of the busbar main body 29 engage with the respective holder-side engagement portions 44 of the holder main body 40 and the engagement pieces 37 of the outside terminal portion 30 engage with the respective terminal engagement portions 41 of the holder 28. Because of these kinds of engagement, play of the holder 28 with respect to the busbar 26 is suppressed. Arrow T indicates the direction of engagement of the busbar-side engagement portions 34 with the holder-side engagement portions 44 (engagement direction T).

Next to the holder 28, the O-ring 27 is attached to the busbar main body 29. The busbar main body 29 is inserted into the O-ring 27 in such a manner that the O-ring 27 is widened to some extent (the inside terminal portion 31 is inserted first) until the O-ring 27 is located at the position of the O-ring attachment portions 35 of the busbar main body 29. Completion of the attachment of the O-ring 27 means completion of the attachment of the busbar component 22 and the busbar component 22 is rendered in the state shown in FIGS. 3 and 5.

<Housing 23>

Referring to FIGS. 8A and 8B (and FIGS. 1-7 when necessary), the housing 23, which is a member constituting the terminal block 21 together with the above-described busbar component 22, is composed of a housing main body 47 and a wall insertion portion 48 and shaped as shown in these figures. When the housing 23 itself is attached to the wall W, the housing main body 47 is located outside the wall W and the wall insertion portion 48 penetrates through the wall W and its tip portion is located inside the wall W. The housing 23 is fixed the wall W by bolts (not shown).

More specifically, the housing 23 further has a busbar insertion hole 49, an O-ring housing portion 50, a holder housing portion 51, a pair of attachment/fixing portions 52, and a housing-side lock portion 53 (see FIGS. 8A and 8B). The busbar insertion hole 49 is formed so as to span the housing main body 47 and the wall insertion portion 48. The O-ring housing portion 50, the holder housing portion 51, the pair of attachment/fixing portions 52 are formed in the housing main body 47. On the other hand, the housing-side lock portion 53 is formed in the wall insertion portion 48.

The busbar insertion hole 49 is a hole into which the inside terminal portion 31 and the busbar main body 29 are inserted in this order, and penetrates through the wall insertion portion 48 straightly. The busbar insertion hole 49 is formed with the housing-side lock portion 53. The housing-side lock portion 53 is a portion to be locked on the busbar-side lock hole 32. As shown in FIGS. 8A and 8B, the housing-side lock portion 53 is shaped like a cantilever arm.

The O-ring housing portion 50 is formed so as to be continuous with a top end portion of the busbar insertion hole 49. The O-ring housing portion 50 is a portion in which the O-ring 27 and the pressing portion 43 and the pressing portion 43 of the busbar component 22 are housed. The O-ring housing portion 50 is formed so that its inner circumferential surface serves as a sealing surface for the O-ring 27.

The holder housing portion 51 is a portion in which the holder 28 of the busbar component 22 is housed. The inner circumferential surfaces of the holder housing portion 51 serve as surfaces (holder guide portions 54) for guiding the respective guide target surfaces 45 of the holder main body 40 and the terminal engagement portions 41. It goes without saying that the holder guide portions 54 are effective in suppressing play of the busbar component 22 with respect to the housing 23 and in guiding the busbar component 22 so that it is inserted straightly. The pair of attachment/fixing portions 52 are portions to be fixed to the wall W.

In the housing 23, the busbar insertion hole 49, the O-ring housing portion 50, and the holder housing portion 51 (where the holder main body 40 is housed) is formed so as to share the same axis that extends in the direction T in which the busbar-side engagement portions 34 of the busbar main body 29 of the busbar component 22 engage with the respective holder-side engagement portions 44.

<Attachment of Busbar Component 22 to Housing 23>

As shown in FIG. 9, attachment of the busbar component 22 to the housing 23 is started from a state that the busbar component 22 can move downward relative to the housing 23. In this state, a worker pushes the busbar 26 at, for example, a portion indicated by arrow S in FIG. 9 with a finger, whereby the busbar component 22 is moved downward. The busbar-side engagement portions 34 of the busbar main body 29 and the holder-side engagement portions 44 of the holder main body 40 are kept engaged because their engagement direction T coincides with the direction of the push by the worker.

As the busbar component 22 is pushed into the housing 23 with the above engagement state kept as it is, as shown in FIG. 10 the busbar main body 29 is inserted into the busbar insertion hole 49. Furthermore, as shown in FIG. 11, the O-ring 27 and the pressing portion 43 of the holder main body 40 are housed in the O-ring housing portion 50. During this housing operation, the pressing portion 43 can come into contact with the O-ring 27 squarely and, with this contact state maintained, the O-ring 27 can be pushed squarely by the pressing portion 43 into the O-ring housing portion 50. (Arrow U indicates the direction in which the O-ring 27 is pushed. This pressing direction U is the same as the above-mentioned engagement direction T.) It goes without saying that the O-ring 27 exhibits good waterproof performance when the O-ring 27 is pushed in squarely.

The attachment of the busbar component 22 to the housing 23 is completed (i.e., the assembling of the terminal block 21 is completed) when the housing-side lock portion 53 of the housing 23 is locked on the busbar-side lock hole 32 of the busbar main body 29 that is inserted into the busbar insertion hole 49 as a result of a continued push by the finger of the worker.

When the attachment of the busbar component 22 to the housing 23 has been completed, the busbar 26 is engaged with the holder 28. Thus, since the housing-side lock portion 53 of the housing 23 is locked on the busbar-side lock hole 32, the holder 28 is also locked (indirectly). (The holder 28 is fixed to the housing 23 though the holder 28 does not have a dedicated lock structure.)

<Advantages of Busbar Component 22 and Terminal Block 21>

As described above with reference to FIGS. 1-11, the busbar component 22 according to the embodiment of the invention, since the busbar 26 and the holder 28 are engaged with each other, play of the holder 28 with respect to the busbar 26 can be suppressed, as a result of which the holder 28 can come into contact with and be pressed against the O-ring 27 squarely when the busbar 26 is pushed. It goes without saying that the O-ring 27 provides necessary waterproofness performance because the holder 28 comes into contact with and be pressed against the O-ring 27 squarely.

In the busbar component 22, since the busbar-side engagement portions 34 and the holder-side engagement portions 44 are formed in the above-described manner, when the busbar 26 is pushed (at a portion indicated by arrow S in FIG. 9), the busbar-side engagement portions 34 are engaged with the respective holder-side engagement portions 44 in the pushing direction and the holder 28 comes into square contact with the O-ring 27 in the engagement direction T. Thus, the O-ring 27 is pushed reliably.

In the busbar component 22, the busbar-side engagement portions 34 and the holder-side engagement portions 44 are formed at the above-mentioned positions (that is, the busbar-side engagement portions 34 are formed in a pair and the holder-side engagement portions 44 are also formed in a pair). Thus, when the busbar 26 is pushed, force is not concentrated at one portion but act equally on left and right portions. Stable engagement states can thus be obtained.

In the busbar component 22, the recessed portions 55 are formed adjoining the top surfaces of the holder-side engagement portions 44, respectively. As a result, the holder-side engagement portions 44 go into the busbar-side engagement portions 34, respectively. Thus, surfaces opposed to each other of the holder-side engagement portions 44 and the busbar-side engagement portions 34 come into contact with each other, whereby play of the holder 28 with respect to the busbar 26 can be suppressed. As a result, when the busbar 26 is pushed, the holder 28 can come into contact with and be pressed against the O-ring 27 squarely.

According to the busbar component 22, since the outside terminal portion 30 of the busbar 26 is also engaged with the holder 28, the number of engagement locations is increased and play of the holder 28 can be suppressed more reliably. As a result, when the busbar 26 is pushed, the holder 28 can come into contact with and be pressed against the O-ring 27 squarely.

On the other hand, the terminal block 21 according to the embodiment of the invention includes the busbar component 22 which provides the above advantages. And the individual portions of the housing 23 are formed so as to be suitable for the engagement direction of the busbar-side engagement portions 34 and the holder-side engagement portions 44 of the busbar component 22. As a result, the terminal block 21 is given necessary waterproof performance.

Since the holder 28 of the busbar component 22 is guided by the housing 23 when the terminal block 21 is assembled, play of the busbar component 22 itself with respect to the housing 23 can also be suppressed. As a result, when the busbar 26 is pushed, the holder 28 can come into contact with and be pressed against the O-ring 27 squarely. Since the holder 28 is guided by the housing 23, the O-ring 27 exhibits necessary waterproof performance for the housing 23.

In the terminal block 21, since the busbar 26 is engaged with the holder 28 in the busbar component 22, the holder 28 is also locked (indirectly) at the same time as the housing-side lock portion 53 of the housing 23 is locked on the busbar-side lock hole 32 of the busbar 26. Thus, the holder 28 need not be formed with a fixing portion that is dedicated to locking on the housing 23, whereby the configuration of the terminal block 21 can be simplified or reduced in size.

It goes without saying that various modifications are possible without departing from the spirit and scope of the invention.

What is claimed is:

1. A busbar component comprising:
a busbar;
a ring-shaped O-ring attached to a busbar main body of the busbar; and
a holder removably attached to the busbar main body through insertion into an insertion hole of the holder,
wherein the busbar main body is formed with a busbar-side engagement portion;
wherein the holder has a holder main body which is arranged between the busbar-side engagement portion and the O-ring and which has the insertion hole of the holder;
wherein the holder main body is formed with, on one opening side of the insertion hole, a ring-shaped pressing portion which is pressed against the O-ring; and
wherein the holder main body is formed with, on another opening side of the insertion hole, a holder-side engagement portion which is engaged with the busbar-side engagement portion.

2. The busbar component according to claim 1, wherein the busbar-side engagement portion and the holder-side engagement portion are formed so as to have an engagement direction that coincides with an axial direction of the busbar main body and a pressing direction for the O-ring.

3. The busbar component according to claim 2, wherein the busbar-side engagement portion is arranged in each of two side surfaces of the busbar main body, and
the holder-side engagement portion is arranged at each of two side positions of the insertion hole that penetrates according to a cross sectional shape of the busbar main body.

4. The busbar component according to claim 3, wherein the holder-side engagement portion is formed so as to have a recessed portion in which the busbar-side engagement portion is inserted.

5. The busbar component according to claim 2, wherein an outside terminal portion extends from one end of the busbar main body perpendicularly to the axial direction of the busbar main body, and
wherein a terminal engagement portion is continuous with the holder main body, and is engaged with the outside terminal portion.

6. A terminal block comprising:
the busbar component according to claim 1; and
a housing to which the busbar component is attached,
wherein the housing has
a busbar insertion hole through which the busbar main body of the busbar component is inserted,
an O-ring housing portion which houses the O-ring of the busbar component, and
a holder housing portion which houses the holder main body of the busbar component; and
wherein the busbar insertion hole, the O-ring housing portion, and the holder housing portion are formed so as to share the same axis that extends in a direction in which the busbar-side engagement portion is engaged with the holder-side engagement portion.

7. The terminal block according to claim 6, wherein the holder housing portion is formed with a holder guide portion which guide at least the holder main body.

8. The terminal block according to claim 6, wherein the busbar insertion hole is formed with a housing-side lock portion as a locking portion for the busbar main body,
wherein the busbar main body is formed with a busbar-side lock portion which is locked with the housing-side lock portion, and
wherein the terminal block is formed so that the holder is also rendered in a locked state when the housing-side lock portion is locked on the busbar-side lock portion.

9. A vehicular device mounted in a vehicle comprising:
a device main body;
a device box which houses the device main body;
the terminal block according to claim 6 which is attached to a wall of the device box; and
a wire harness which is electrically connected to the device main body via the terminal block.

\* \* \* \* \*